United States Patent [19]

Spatafora et al.

[11] Patent Number: 4,921,106

[45] Date of Patent: May 1, 1990

[54] SELECTION DEVICE FOR SWEET CONFECTIONS

[75] Inventors: Mario Spatafora; Antonio Gamberini, both of Bologna, Italy

[73] Assignee: G.D. Societa per Azioni, Bologna, Italy

[21] Appl. No.: 309,433

[22] Filed: Feb. 13, 1989

[30] Foreign Application Priority Data

Feb. 25, 1988 [IT] Italy .................................. 3344 A/88

[51] Int. Cl.⁵ ............................. B07C 5/02; B07C 5/04
[52] U.S. Cl. ..................................... 209/539; 198/392; 209/634; 209/656; 209/919; 209/940; 221/163
[58] Field of Search ............... 209/539, 540, 625, 628, 209/629, 634, 635, 656, 658, 919, 940; 198/392, 397, 443; 221/157, 163

[56] References Cited

U.S. PATENT DOCUMENTS

| | | | |
|---|---|---|---|
| 3,554,372 | 1/1971 | Gutman | 209/658 X |
| 3,696,924 | 10/1972 | Sterling | 209/658 X |
| 3,826,405 | 7/1974 | Hoppman et al. | 198/392 X |
| 4,709,798 | 12/1987 | Herzog | 209/919 X |
| 4,768,639 | 9/1988 | Gamberini et al. | 198/392 |

Primary Examiner—Donald T. Hajec
Attorney, Agent, or Firm—Cushman, Darby & Cushman

[57] ABSTRACT

A selection device for candy, in which confections are dispensed loose onto a first table turning at relatively low speed and spiralled around a fixed guide before being scattered onto a second, annular table that is concentric and coplanar with the first and rotates at higher speed; this second table is encompassed by a cylindrical pan, rotated at the same higher speed about an axis angled away from the axis of the tables to the extent that corresponding peripheral stretches of the second table and the top edge of the pan are made to converge in the same plane. The top edge of the pan is castellated with tapered radial sockets that are designed to accommodate the confections singly, conveying them through a circular path and into contact with a number of fixed cam profiles by which they are deflected from the sockets in such a way as to enable centrifugal ejection at respective selection and reject stations.

13 Claims, 4 Drawing Sheets

4,921,106

SELECTION DEVICE FOR SWEET CONFECTIONS

BACKGROUND OF THE INVENTION

The present invention relates to a selection device for candy and other sweet confections. The term "selection device" is used to denote an apparatus designed to receive confections, arrange them in orderly fashion if appropriate, and convey them toward a further handling machine, eliminating those of substandard shape and size together with any unwanted fragments and powdered matter.

Conventional devices for the selection of sweet confections generally comprise an infeed chute from which the confections are dispensed loose, usually by free fall, onto a substantially horizontal table provided with a plurality of rectilinear vibrating conveyors. Confections received in this manner by the conveyors are carried along the table toward and ultimately into contact with a plurality of obstacles; these match the conveyors in number and consist in elements substantially of wedged shape, each one of which is installed in a fixed position over the relative conveyor. By causing interference between the wedges and the confections in a given manner, substandard pieces can be removed from the conveyors while allowing the regular confections through to a further production line machine. Conventional devices of the type thus outlined are beset by a number of drawbacks, amongst which, for example, excessive bulk, high noise levels, and the need for frequent stoppages to effect cleaning and servicing operations.

In effect, the selection of candy confections using this rectilinear conveyor table system necessarily dictates equipment of considerable longitudinal dimensions; the high noise levels are produced as the result of using vibrating conveyors, whilst the frequent stoppages are dictated by difficulties encountered in clearing the table of fragments shed by substandard confections, and of powdered waste matter.

It will be observed, in fact, that such waste matter consists largely in sugary substances that are ruinous to moving machine parts, and must therefore be removed periodically if the parts in question are not to seize up altogether. Accordingly, the object of the present invention is to embody a selection device for sweet confections that remains free of the drawbacks mentioned.

SUMMARY OF THE INVENTION

The stated object is realized with a selection device according to the present invention, which comprises a feeder chute from which confections are dispensed loose onto a central reception table rotatable about a substantially vertical axis, and made to turn at a prescribed speed; a stationary guide is positioned substantially in contact with a top surface of the central table so as to create a spiral along which the candy is conveyed to a peripheral area affording an exit from the table. The table is encompassed by an orbital selection unit, comprising first conveyor means by which the confections are accelerated loose along a first path, departing from the peripheral exit area and encircling the vertical axis externally of the central table, and second conveyor means, by which the confections are transported singly, spaced apart at equal distance one from the next, along a second path substantially encircling the first path and coinciding with it at a convergence zone, where the confections circulating on the first conveyor means are transferred centrifugally to the second conveyor means.

At least two stations are located in sequence along the path of the second conveyor means, at which regular confections are selected and substandard confections rejected, respectively. Selection is enabled by gaging means located along the second path, and by cam-profile ejection means positioned at the selection station, for removal of regular confections, and at the reject station, for removal of substandard confections; in either case, ultimate ejection of the single confections from the second path occurs by centrifugal force.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
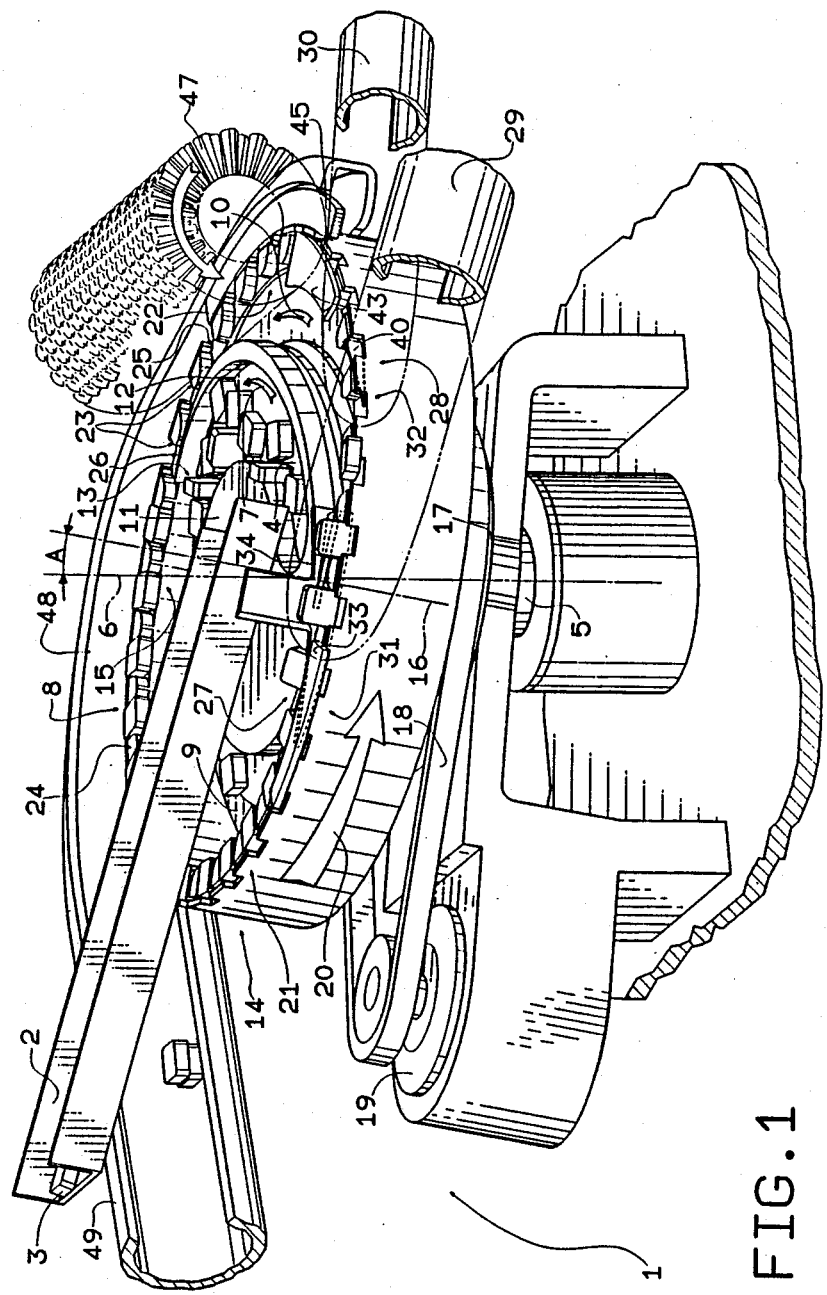
FIG. 1 shows a preferred embodiment of the selection device, according to the invention, viewed in perspective from above with certain parts omitted better to reveal others.
Figure 2:
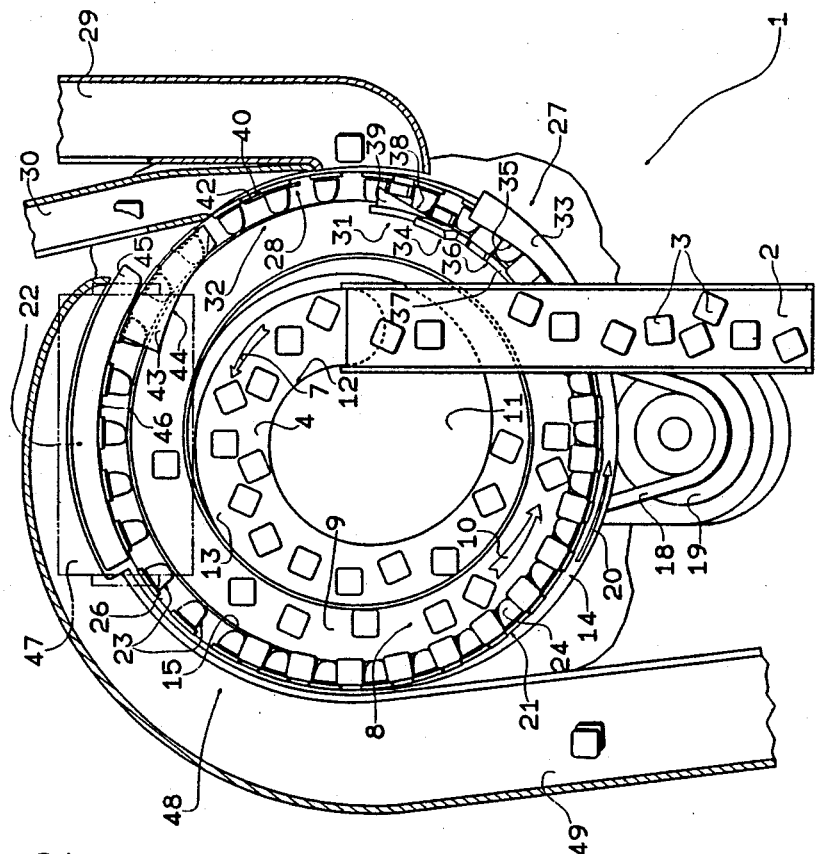
FIG. 2 is a plan of the device as in FIG. 1.

In FIG. 1 of the drawings, 1 denotes a selection device for sweet confections, in its entirety. Such a device operates in conjunction with a feeder comprising a chute 2 from which confections 3 are dispensed, dropping at random onto a substantially horizontal and centrally located reception table 4 supported from beneath by a bearer pedestal 5 with a substantially vertical axis 6. The table 4 will be connected to a drive shaft (not illustrated), extending upwards from the pedestal 5, by which it is rotated at a substantially constant, prescribed speed, in the direction of the arrow denoted 7. The device 1 further comprises an orbital selection unit, denoted 8 in its entirety, affording first conveyor means that consist in a substantially flat second table 9 of annular embodiment, disposed coaxial with and in the same plane as the central table 4, the peripheral inner edge of which lies substantially in contact with the peripheral outer edge of the first table 4. The second table 9 is rotatably supported by the pedestal 5, and will be associated with a conventional transmission (not illustrated), interconnecting the two tables 4 and 9 in such a way that rotation of the first table 4 in the direction of the arrow 7 is accompanied by rotation of the second table 9, moving in the same direction, indicated by the arrow denoted 10, but at a significantly higher speed.

11 denotes a stationary guide located above the central table 4, supported by the pedestal 5 and combining with the top surface of the table 4 to create a voluted channel 12 that extends from the area of the table 4 directly beneath the outlet of the chute 2 around to a peripheral area 13 where the first table 4, hence the channel 12 itself, communicates with the second table 9.

The orbital selection unit 8 further comprises an essentially cylindrical pan 14, the cylindrical wall 15 of which entirely encompasses the tables 4 and 9; the pan is installed on a tilt, its axis 16 canted through a given angle A away from the axis 6 of the pedestal. 17 denotes a hub attached to the bottom of the pan 14, coaxial with its axis 16, which is supported rotatably by the pedestal 5 and affords a pulley 17 around which to loop a drive belt 18 via which the pan is connected to and set in rotation about its own axis 16 by a motor 19; the pan 14 is made to turn, preferably, at a speed matching that of the second table 9, and revolves in the direction indicated by the arrow denoted 20. Thus, the directions denoted by arrows 7, 10 and 20 are similar.

The cylindrical wall 15 of the pan 14 lies with its inner surface substantially in contact with the peripheral outer edge of the second table 9, and terminates uppermost in second conveyor means that consist in a castellated ring 21 disposed coaxial with the axis 16 of the pan 14 and rotatable as one with the pan itself. Given the angle that separates the pan and pedestal axes 16 and 6, the ring 21 is tilted in relation to the second table 9, and the height and position of the pan wall 15 in relation to the table 9 are such that the ring 21 revolves predominantly on a level above that of the table 9; in effect, the paths of the ring 21 and the second table 9 coincide only through a relatively short distance at a convergence zone denoted 22, where a stretch of the internal periphery of the ring 21 lies substantially tangential to a corresponding stretch of the peripheral outer edge of the second table 9.

More exactly, it will be seen from FIG. 1 that the ring 21 is castellated with a plurality of radial sockets 23 distributed uniformly around its topmost surface 24. Each such socket 23 extends outward from the peripheral inner edge of the surface 24, and is of transverse dimensions such as to admit a regular confection 3; of longitudinal dimensions (i.e. radial, in relation to the axis 16) such as to accommodate a regular confection 3 substantially in its entirety; and of depth marginally less than the thickness of a regular confection 3. The single socket 23 is splayed at the side offered inward to the second table 9, and tapered radially toward a gaged external gap 25 the width of which is less than the minimum width of a regular confection 3. The bottom of the socket 23 affords a substantially flat surface 26, which lies essentially within the same plane as the top surface of the second table 9 when the socket 23 passes through the convergence zone 22.

Rotating about the pan axis 16, the ring 21 is made to interact with two cam-profile ejection units 27 and 28 (see FIG. 3) by which regular and substandard confections 3, respectively, are steered from the sockets 23 into two corresponding ducts 29 and 30 positioned alongside the peripheral outer edge of the ring 21; the two ducts are located respectively at a selection station 31 (encountered first, with respect to the direction of rotation arrowed 10), and a final reject station 32.

Figure 6:
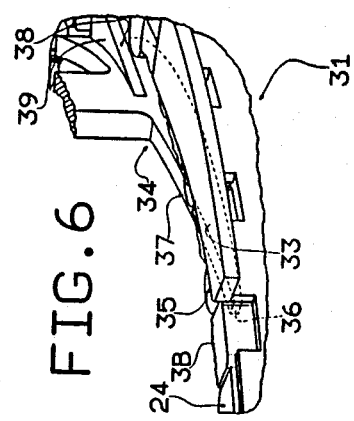
FIGS. 4, 5 and 6 are perspectives of a first detail of FIG. 3, viewed on larger scale and in different operating situations.
Figure 5:
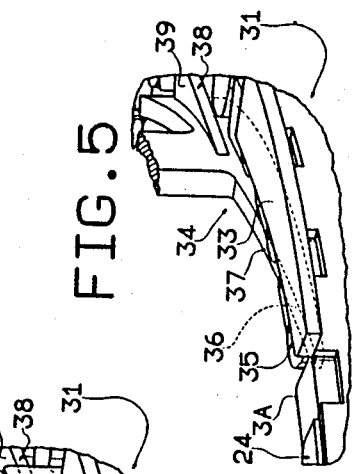

For selection purposes, substandard confections 3 include those of insufficient depth (thickness), such as the confection denoted 3A in FIG. 5, and those which are either short (radially) or chipped, such as that denoted 3B in FIG. 6.

The ejection unit 27 at the selection station 31 comprises first and second fixed cam plates 33 and 34, of which the first is positioned externally of the socketed ring 21 and the second internally, considered in the radial dimension of the device 1. The first plate 33 consists in a flat deflector, placed in the path of the sockets 23 substantially in contact with the top surface 24 of the ring 21, the inward facing edge 35 of which exhibits an essentially spiral contour angled from the outside inward, in relation to the direction arrowed 10, departing from a point coinciding substantially with the peripheral outer surface of the ring 21 and extending to a point coinciding substantially with the peripheral inner surface of the ring 21. The second plate 34 comprises a first deflector 36, which describes a cylindrical surface coaxial with the ring 21 and terminates uppermost in a helical edge 37 angled upwards in the direction of the arrow 10 from a level immediately below the bottom surface 26 of the sockets 23 to a level immediately above the top surface 24 of the ring. The top end of this first deflector 36 merges ultimately with the leading end of the angled edge 38 of a second deflector 39 that lies parallel with the first cam plate 33 and extends outward, above the ring 21.

Figure 3:
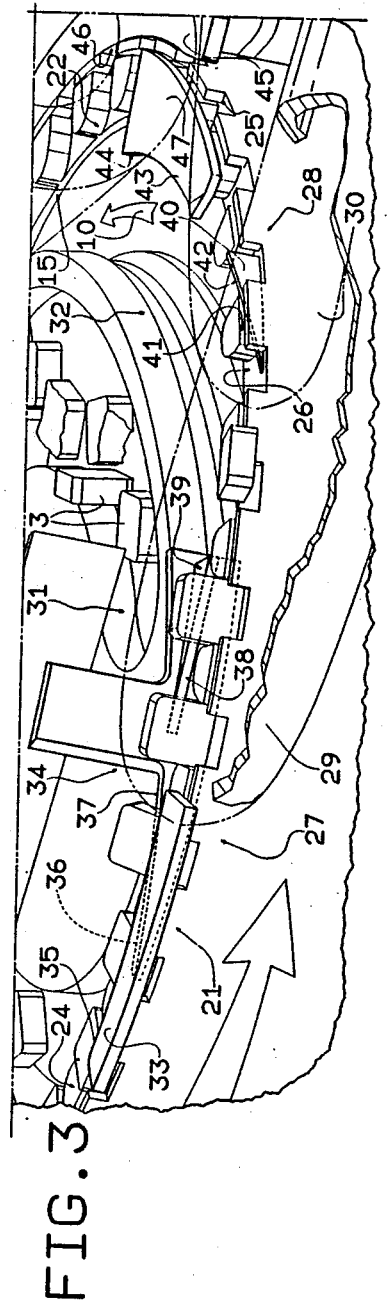
FIG. 3 shows a detail of FIG. 1 viewed in perspective from above and on larger scale.

In the example of FIG. 3, the first cam plate 33 is advanced to a degree from the second cam plate 34, considered in relation to the rotation arrowed 10, whilst the and section of its contoured edge 35 is positioned substantially in horizontal alignment with the top of the helical edge 37.

The reject ejection unit 28 similarly comprises a cam plate 40, which describes a cylindrical surface coaxial with the ring 21, engages slidably by way of its bottom edge in an annular groove 41 let into the top surface 24, and is of depth at least equal to that of the sockets 23. The plate 40 in question exhibits an upwardly angled edge 42, of which the leading end lies on a level with the groove 41, whilst the trailing edge rises above the level of the top surface 24 of the ring 21.

43 denotes a flipper located at the entry into the convergence zone 22, lying above and substantially parallel with the top surface 24, the inner edge 44 of which exhibits a spiral contour that extends gradually inward in relation to the inner surface of the cylindrical pan wall 15.

45 denotes a fence flanking an intermediate stretch of the convergence zone 22, positioned externally of and parallel with the ring 21, the substantially circular inner edge 46 of which lies tangential to the gaps 25.

Finally, 47 denotes a rotary brush 47 located above the convergence zone 22, which both assists entry of the confections 3 into the sockets 23 and serves to separate or knock out any confections 3 that may have stuck together.

In operation, the sweet confections 3 run down the chute 2 onto the rotating central table 4, dropping into the channel 12, spreading apart initially and then continuing around to the peripheral area 13, where they are transferred to the outer table 9 by centrifugal force. Once on the second table 9, the confections 3 are accelerated strongly as a result of the higher speed of rotation and flung outwards into contact with the cylindrical wall 15 of the pan 14; following expulsion from the channel 12, moreover, this same acceleration produces a further scatter, so that on reaching the pan wall 15, the confections 3 will be arranged substantially in single file.

Figure 8:
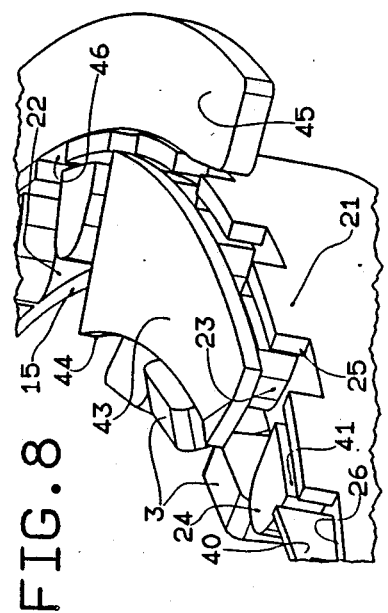

The confections 3 continue forward in contact with the wall 15 until reaching the convergence zone 22, where some will find their way into the sockets 23; the remainder continue to circulate on the table 9, still in contact with the wall 15, until sockets 23 can be located during successive rotations. As illustrated in FIG. 8, it can happen that certain of the confections 3, which in the example of the drawings are of flat rectangular parallelepiped shape, remain standing "on-edge" following passage to the second table 9; any confection circulating in this position must necessarily encounter the flipper 43 on approaching the convergence zone 22, and accordingly, is made to topple over through 90° and lie flat, thereby enabling its entry into one of the sockets 23.

Figure 9:
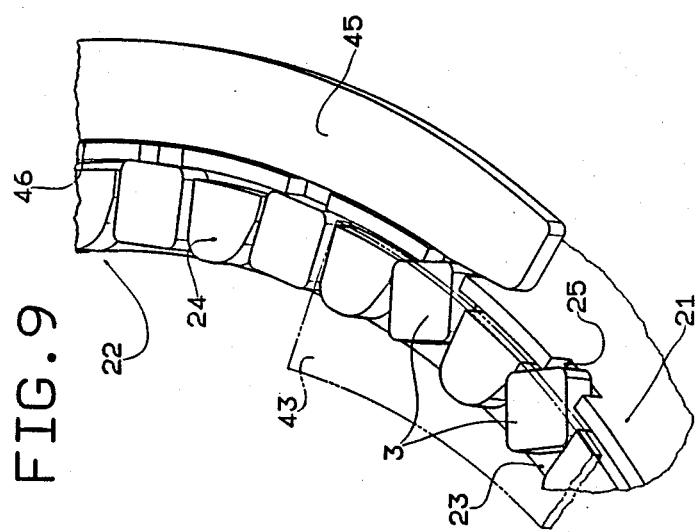
FIGS. 7, 8 and 9 are perspectives of further details of FIG. 3, viewed on larger scale and in operation.
Figure 7:
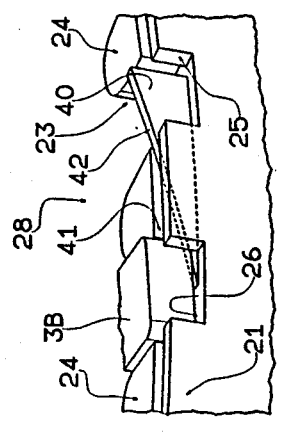

Again, as illustrated in FIG. 9, it may happen that certain confections 3 locate incorrectly in their sockets 23 and remain skew. In a situation such as this, one corner of the confection 3 will generally project through the gap 25 of the radial socket 23; accordingly, this corner is brought into contact with the fence 45, and the confection 3 is caused to turn around inside the socket 23 until correctly positioned.

Needless to say, where the confections 3 happen to be of shape other than as illustrated and mentioned above, for example spherical, the flipper 43 and the fence 45 can be discarded.

Positioned in the sockets 23, the confections are first conveyed by the revolving ring 21 through an initial reject station 48 immediately following the convergence zone 22, considered in the direction of the arrow 10; here, the effect of centrifugal force expels any dust and powdered matter, or fragments of the confections that may have found their way into the sockets 23, projecting them through the gaps 25 and into a duct 49. The gaps 25 therefore function as initial sizing gages, inasmuch as the radial sockets 23 retain only those confections 3 that present the correct transverse dimensions. Also removed at the initial reject station 48 will be any confections 3 that may have remained stuck together in the socket 23, even after passing under the brush 47; these too are expelled, by centrifugal force.

Continuing their passage around the pan, carried in the sockets 23, the single confections 3 ultimately encounter the ejection unit denoted 27.

Figure 4:
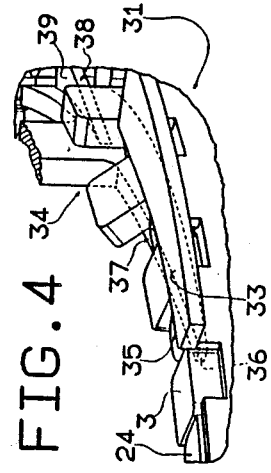

As FIG. 4 illustrates, each confection 3 exhibiting regular thickness, hence projecting marginally above the level of the socket 23, will be engaged by the contoured edge 35 of the first cam plate 33, steered radially inward onto the top edge 37 of the first deflector 36, tilted up substantially above the level of the ring 21, and guided into contact with the edge 38 of the second deflector 39. Thus it happens, by a combination of deflection and centrifugal force, that each regular confection 2 finds its way ultimately into the duct 29 of the selection station 31.

As discernable from FIG. 5, a confection 3A of less than the prescribed thickness will be completely encompassed by the socket 23, and therefore cannot be engaged by the first cam plate 33; accordingly, any such confection 3A by-passes the second cam plate 34 altogether.

As illustrated in FIG. 6, a confection may also be of regular thickness and width, but short in the remaining radial dimension; such a confection 3B will be engaged by the first cam plate 33 just the same, but does not project far enough inward from its socket 23 to be lifted by the second plate 34.

Accordingly, any rejects of the type denoted 3A or 3B will pass through the regular ejection unit 27 and remain in their sockets 23 until encountering the upwardly angled edge 42 of the cam plate 40 at the second ejection unit 28, where they are lifted above the level of the sockets 23 to enable final ejection by centrifugal force into the relative duct 30.

As regards the rejection of confections that may exhibit greater than regular thickness, these can either be removed from their sockets 23 naturally, by centrifugal force (where the center of mass is located above the top surface 24 of the ring 21), or alternatively, expelled into the initial reject duct 49 by another ejection unit (not illustrated) located at the relative station 48, which will be similar to the ejection unit denoted 27 in every respect save for the fact that its first plate 33 will not be positioned in contact with the top surface 24 of the rings 21, but elevated from it by a distance corresponding to the maximum permissible thickness of the regular confection 3, minus the depth of the socket 23.

Further to this particular aspect of the invention, it will be observed that, in the event of there being no requirement for thickness control, both the additional ejection unit (not illustrated) and the first cam plate 33 of the selection unit 27 can be dispensed with. In this instance, in fact, it suffices to utilize a socketed ring 21 of annular width marginally less than the prescribed width of the confection (measured radially from the axis 16) and position the first deflector 36 substantially in contact with the peripheral inner edge of the ring 21.

It will be appreciated from the foregoing that, by effecting selection with the confections following a circular path, the dimensions of the device 1 can be reduced considerably. In addition, the device incorporates practically no vibrating parts, and therefore is able to operate at significantly low noise levels. Lastly, by adopting an orbital design in which the two tables 4 and 9 and the ring 21 are kept rotating continuously, one ensures a constant ejection from the device of powdered matter and fragments, and in consequence, a drastic reduction both in the frequency and in the duration of pauses for cleaning and servicing.

What is claimed:

1. A selection device for sweet confections, comprising:
    a feeder chute from which loose confections are dispensed to the device;
    a central reception table, positioned below the outlet of the feeder chute, rotatable about a substantially vertical axis, and made to turn at a prescribed speed;
    a stationary guide, positioned substantially in contact with a top surface of the central table and creating a voluted channel along which confections dispensed from the, chute are conveyed toward a peripheral exit area of the central table, thereby affording an exit from the table;
    an orbital selection unit, comprising first conveyor means by which the loose confections departing form the peripheral exit area are accelerated along a first path, and said first conveyor means encircling the vertical axis externally of the central table, said selection unit also including second conveyor means, by which the confections are transported singly, spaced apart at equal distance one from the next along a second path substantially encircling the first path and coinciding therewith at a convergence zone where confections circulating on the first conveyor means are transferred centrifugally to the second conveyor means;
    at least two stations comprising a selection station and a rejection station located in sequence along the path of the second conveyor means, at which regular confections are selected and substandard confections rejected, respectively;
    gaging means located along the second path;
    cam-profile ejection means, positioned at the selection station and serving to ensure the removal of regular confections from the second path by centrifugal force;

cam-profile ejection means positioned at the reject station, serving to ensure the removal of substandard confections from the second path by centrifugal force.

2. A device as in claim 1, wherein the first conveyor means consist of a second table of flat annular shape encircling, coaxial and coplanar with the central table, which second table has an outer peripheral surface and is rotatable about the same axis as the central table and made to turn at higher speed.

3. A device as in claim 2, wherein the second conveyor means includes a cylindrical wall and the second table is bounded externally by said cylindrical wall.

4. A device as in claim 3, wherein the second conveyor means consist of a flat ring having a peripheral inner surface and a peripheral outer surface, lying at least partly in a plane located above the plane occupy by the two tables, rotatable about an axis that is angled in relation to the axis of rotation of the two tables, and coinciding with the convergence zone at which a stretch of its peripheral inner surface is disposed substantially tangential to a corresponding stretch of the peripheral outer surface of the second table.

5. A device as in claim 4, wherein the ring and the cylindrical wall are coaxial and integral with one another.

6. A device as in claim 4, wherein the ring includes a plurality of radial sockets formed into its top surface and radiating outward from the peripheral inner surface, each one of which is designed to accommodate a single confection.

7. A device as in claim 6, wherein gaging means consist in a plurality of gaps located around the peripheral outer surface of the socketed ring, each affording free passage from a corresponding radial socket into the space surrounding the device, and exhibiting a transverse dimension that is less than the minimum transverse dimension of a regular confection.

8. A device as in claim 6, wherein the ejection means of the reject station is fixed, and positioned in the path of the radial sockets at a point downstream from the position of the ejection means of the selection station, in relation to the rotation of the ring, in such a way that any single confections still occupying the sockets will be engaged, extracted, and ejected by centrifugal force.

9. A device as in claim 8, wherein the surface of the ring uppermost exhibits an annular groove of depth at least equal to the depth of the sockets, and the ejection means of the reject station comprise a cam-profiled plate slidably engaged in the groove.

10. A device an in 6, wherein the ejection means of the selection station are fixed, and positioned along the path of the radial sockets at a point upstream from the position of the ejection means of the reject station, in relation to the rotation of the ring, in such a way that regular confections will be engaged and extracted from the relative sockets one by one, and ejected by centrifugal force.

11. A device as in claim 10, wherein the ejection means at the selection station comprise first and second cam plates located in fixed radial positions externally and internally of the outer peripheral surface of the socketed ring, respectively, the first plate positioned in the path of the sockets in such a manner that each regular confection occupying a socket is engaged in turn and steered inward radially from the socket, and the second plate positioned relative to the ring in such a way as to enter into contact with a part of the regular confection that is caused to project inward radially by the steering action of the first cam plate, and lift the confection clear of the socket to enable its ejection by centrifugal force.

12. A device as in claim 11, wherein the depth of the single radial socket is less than the thickness of a regular confection, and the first plate is positioned substantially in contact with the top surface of the ring in such a way as to deflect the confection inwards in relation to the path followed by the sockets.

13. A device as in claim 11, wherein the second cam plate comprises a deflector with an upwardly angled surface.

* * * * *